(12) United States Patent
Sunarno

(10) Patent No.: US 10,120,665 B1
(45) Date of Patent: Nov. 6, 2018

(54) LATENCY-AWARE HOST-AGNOSTIC RUNTIME

(71) Applicant: Amazon Technologies, Inc., Seattle, WA (US)

(72) Inventor: Ronald Widharta Sunarno, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/280,813

(22) Filed: Sep. 29, 2016

(51) Int. Cl.
- *G06F 9/45* (2006.01)
- *G06F 8/41* (2018.01)
- *G06F 8/60* (2018.01)

(52) U.S. Cl.
CPC ............ *G06F 8/4441* (2013.01); *G06F 8/433* (2013.01); *G06F 8/60* (2013.01)

(58) Field of Classification Search
CPC ............................... G06F 8/4441; G06F 8/433
USPC ......................................................... 717/155
See application file for complete search history.

(56) References Cited

U.S. PATENT DOCUMENTS

| | | | |
|---|---|---|---|
| 6,637,025 B1 * | 10/2003 | Beadle | ................ G06F 9/45504 717/148 |
| 8,453,143 B2 * | 5/2013 | Mahalingam | ....... G06F 9/45537 710/266 |
| 2005/0268225 A1 | 12/2005 | Pelegri-Llopart et al. | |
| 2006/0149731 A1 * | 7/2006 | Schirmer | .......... G06F 17/30598 |
| 2009/0125546 A1 | 5/2009 | Iborra et al. | |
| 2012/0222003 A1 * | 8/2012 | Shukla | ...................... G06F 8/10 717/115 |
| 2015/0317156 A1 | 11/2015 | Chan et al. | |
| 2016/0103699 A1 * | 4/2016 | Thakkar | .............. G06F 9/45558 718/1 |

* cited by examiner

*Primary Examiner* — Anna C Deng
*Assistant Examiner* — Lanny N Ung
(74) *Attorney, Agent, or Firm* — Davis Wright Tremaine LLP

(57) ABSTRACT

Application source code that includes notation indicating a latency level between methods is evaluated. Based in part on the latency level, scores for method dependencies are calculated. A set of packages is generated for the methods in accordance with a clustering strategy that is based at least in part on the scores. The set of packages is then deployed to at least one host in accordance with an affinity threshold.

20 Claims, 10 Drawing Sheets

LATENCY-AWARE HOST-AGNOSTIC RUNTIME

BACKGROUND

Customers seeking to host and execute applications and web services often utilize networks of computers and storage resources provided by computing resource service providers. However, it becomes challenging to design computer applications in such a way as to optimize their latency and scalability when deployed to distributed systems. For example, application packages deployed to the same host can restrict scalability of that application, while application packages distributed to a highly distributed system can impact application latency. Moreover, manually specifying which components of an application should run on which elements of a distributed system requires considerable technical ability and can be repetitious, time-consuming, and tedious. Further, a considerable amount of re-engineering may be involved, should the component distribution be changed. Consequently, a need exists for an automated process for application deployment on distributed systems that provides a balance of latency and scalability.

BRIEF DESCRIPTION OF THE DRAWINGS

Various techniques in accordance with the present disclosure will be described with reference to the drawings, in which.

DETAILED DESCRIPTION

Figure 1:
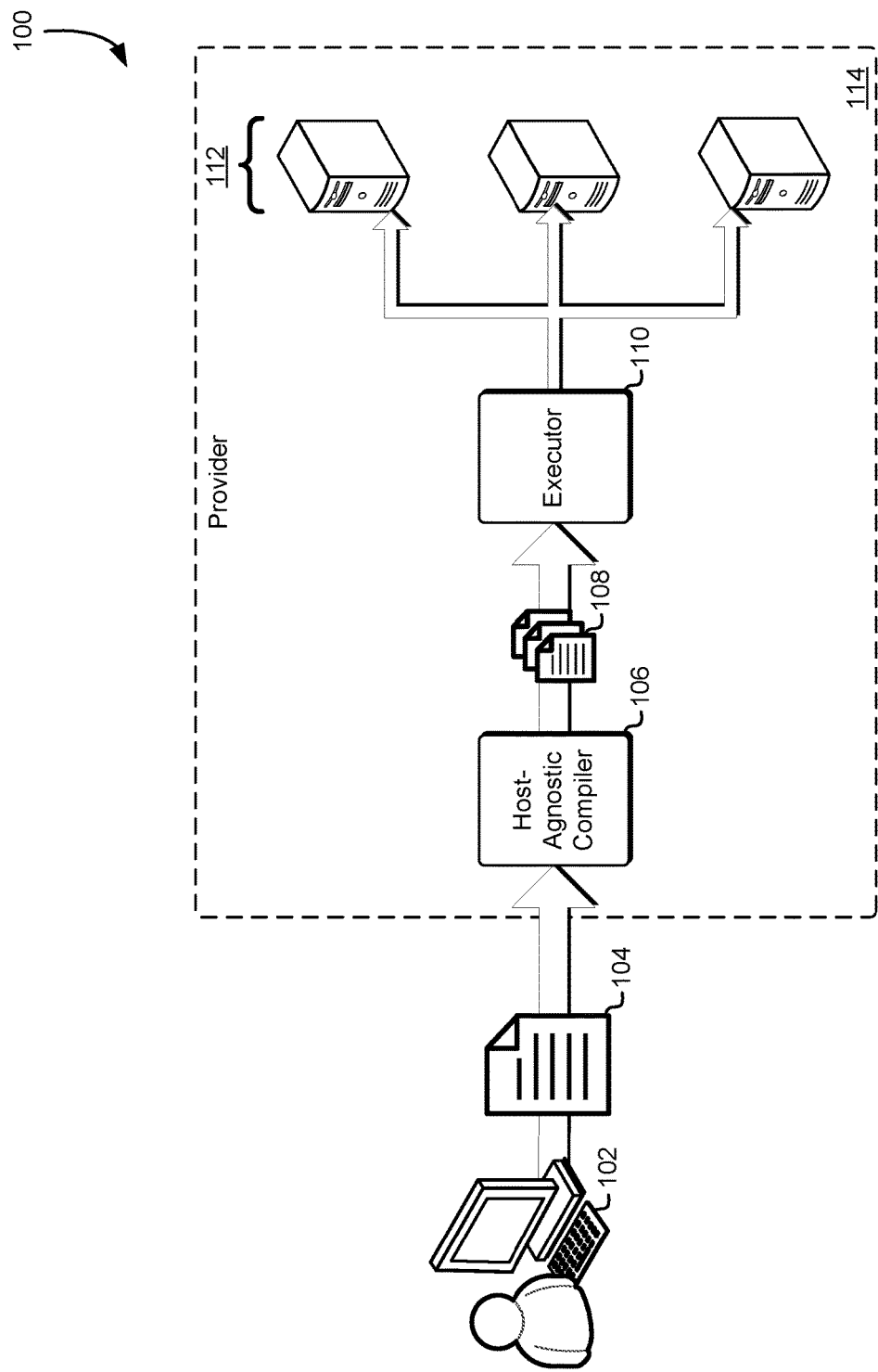
FIG. 1 shows an illustrative example of an environment in which latency-annotated application code has been processed by a host-agnostic compiler and distributed to multiple application servers in accordance with an embodiment.

During the construction of a distributed application, the service boundaries (e.g., what code runs on a web server, application server, and/or database server) are typically required to be defined during architectural design or development. Any change to the service boundaries likely mandates either redevelopment or redesign. The current disclosure provides a mechanism for decoupling a service boundary change from an application code change. In some examples, a customer of a computing resource service provider has a software application that the customer desires to run on one or more hosts (which may be virtual machine instances capable of hosting the application). That is, the customer may have an account with the computing resource service provider and have an associated account identifier that associates the customer with the hosts. Alternatively, hosts may be instantiated as software containers.

An architect or developer of the application may wish to specify the affinity of one method for another and may direct the deployment of the application, whether that deployment involves one or many hosts, to collocate one or more methods within the same container, virtual host, or physical server so as to minimize the latency of method invocation. This specification allows a separate administrator or automated entity when deploying the application to implement a package clustering strategy, which could further include an affinity threshold. The package clustering strategy allows the application to be deployed to a more optimal number of containers, virtual hosts, and physical servers. This deployment allows a balance to be struck between horizontal scalability, vertical scalability, application performance, and resource costs.

In one example, the application source code contains latency-notation such that a host-agnostic compiler could discriminate between frequently accessed methods that the developer wishes to deploy in proximity and infrequently accessed or high cost methods that may be off-loaded to another host. That is, for a method that is frequently accessed, the developer may use "low latency" notation to indicate a preference to have the method executed on the same host. Conversely, if the method is high cost because it requires greater computational power, the developer may wish use "best effort" notation to indicate that the method can be deployed to a dedicated host. The compiler, while parsing this application code, constructs a dictionary of method-to-method affinity scores and then constructs a set of packages for deployment. These affinity scores would indicate a target proximity between packages deployed in the computing environment.

These packages are then deployed to a runtime service, an executor, that considers the resources made available to it for the computing environment, including an affinity threshold representing a balance between scalability and latency, and deploys the packages to a set of hosts. In some cases the hosts might represent thread pools within a single virtual machine or container. In other cases the hosts might represent newly instantiated virtual machines or containers as well as recruited physical servers. As necessary, the executor might cause additional hosts to be instantiated to support the package clustering strategy.

The application could be designed and developed as a monolithic code base. Then, during deployment, the executor could decide which packages might be hosted in a distributed computing system (e.g., the cloud) by a service provider and which packages might be hosted on a customer's equipment. For example, portions of the application (packages) might be downloaded to a personal computer or a mobile device. Packages requiring low latency might run locally on the mobile device. Alternatively, packages requiring greater computing power or storage might execute remotely on a service provider's hosts.

In the preceding and following descriptions, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Techniques described and suggested in the present disclosure are directed to an improvement of computer functionality, specifically the field of distributed computing, by facilitating redefinition of service boundaries without re-architecture or re-coding. Additionally, techniques described and suggested in the present disclosure improve efficiency, functionality, and scalability by allowing computing activities to be distributed to a collection of computing systems that perform remote method invocation, thereby enabling such computing systems to limit clustering of software based on developer intent. Moreover, techniques described and suggested in the present disclosure are necessarily rooted in computer technology in order to overcome problems specifically arising with limitations on scalability and reliability by requiring static deployment of computing elements.

FIG. 1 illustrates an environment in which various techniques may be implemented. Environment 100 illustrates a client 102 submitting latency-notated application code 104 to a host-agnostic compiler 106 provided to a computing resource service provider 114, and as output, the compiler applies a package clustering strategy and generates a set of packages 108 containing class files or optimized native machine code. These packages are then consumed by an executor 110, which determines the hosts 112 to which the individual packages are deployed. The client 102 may be a computer system configured (e.g., with executable instructions) to perform various operations described herein. Similarly, the client 102 may be a type of electronic client device 1002 as described in FIG. 10. The client 102 may operate in accordance with a client application, which may be the executable instructions that configure the client to operate as discussed herein.

The computing resource service provider 114 may provide one or more computing resource services to its customers individually or as a combination of services of a distributed computer system. The one or more computing resource services of the computing resource service provider may be accessible over a network and may include services such as virtual computer system services, block-level data storage services, cryptography services, on-demand data storage services, notification services, authentication services, policy management services, task services, and/or other such services. Not all embodiments described include all of the services described, and additional services may be provided in addition to, or as an alternative to, services explicitly described.

Customers of the computing resource service provider 114 may communicate with one or more of the services via an interface, which may be a web services interface or any other type of customer interface. Each service provided by a computing resource service provider may have its own interface, and subsets of the services may have corresponding individual interfaces in addition to, or as an alternative to, a common interface. A customer may communicate with the computing resource service provider through a network whereby the network may be a communication network, such as the Internet, an intranet, an internet service provider (ISP) network and/or some other such network as described below.

The latency-notated application code 104 may refer to program code that contains notations by a software developer designating a desired proximity between methods upon deployment (e.g., in a distributed system) based on latency requirements. Placement may range from within the same thread, where low-latency is desired, to different network-separated hosts, where horizontal scalability is prioritized. The notation may discriminate, for example, between "low-latency" and "best-effort."

The package clustering strategy may provide a technique for optimizing host utilization, latency, and throughput by establishing criteria for determining when the system will incorporate additional physical hosts, instantiate additional virtual hosts or containers on existing physical hosts, create additional thread pools on existing virtual hosts or containers, or create additional threads on existing thread pools. The package clustering strategy may take into consideration the number and size of physical hosts available, the number of virtual hosts or containers available on each physical host, the available processors and memory, and the customer's budget. A clustering strategy might begin with the use of uniformly sized virtual hosts or containers on physical servers where the number of virtual hosts or containers instantiated is based on the capacity of the physical server. In such an environment, the first packages might be evenly distributed across the available virtual hosts or containers on one or more physical servers.

Any packages specifying a requirement to be collocated digresses from this balanced distribution approach and, consequently, are explicitly placed with its dependent(s). The remainder of the packages are distributed across the available hosts. Alternatively, the package clustering strategy might first group co-dependent packages and then explicitly create properly sized hosts on properly sized physical servers. Remaining packages could then be deployed to any available host or container on any available physical server.

The set of packages 108 may consist of the output of the host-agnostic compiler 106 and may be stored on a file system or in a database. The set of packages 108 may also be temporarily stored such that they may be deployed in response to a request from a customer, from a computing device under the control of the customer, or from an entity authorized by the customer to deploy the set of packages 108 in one or more hosts 112 associated with an account of the customer, or through the use of a scheduling system.

The executor 110 may receive the set of packages 108 as input and subsequently allocate resources from physical servers, instantiate hosts, and deploy the packages 108 to the hosts, containers, and thread pools on those hosts based on the package clustering strategy and the affinity scores between the packages. The executor 110 may specify the resources allocated to the hosts; e.g., processors and memory. The executor 110 may also implement security restrictions limiting the resources available according to a customer subscription or account identifier that associates the customer with the application to be deployed. The executor 110 may further take as input an affinity threshold value, which may allow the customer to choose a particular level of service.

The application could be further designed to utilize a service that executes code in response to system events (e.g., changes in data, shifts in system state, actions by users, triggered by an occurrence of an event in another service, directly triggered by another service, according to a schedule, etc.) and automatically manages the compute resources (e.g., server and operating system maintenance, capacity provisioning and automatic scaling, code monitoring and logging, etc.) required by that code (i.e., an event-driven compute service). In this manner, the executor 110 may also support "just-in-time" deployment and execution, in which a system event results in the deployment of additional packages, not initially deployed, that are then distributed according to the affinity threshold. For example, the executor 110 may determine that a cloud-based method or function that would be executed many times by a customer method should be collocated on the host or container with the calling method. Locating both functions on the same host or container could eliminate significant network latency.

The hosts 112 may represent different threads, different thread pools, different containers, different virtual machines on the same physical server, virtual machines on different physical servers, different physical servers, or any combination of the above. The virtual machines may support multiple thread pools. In some examples, a customer of a computing resource service provider 114 providing computing resources capable of supporting the hosts 112 has a service (e.g., software application for processing data, etc.) that the customer desires to run in one or more hosts (which may be virtual machine instances capable of hosting virtual hosts). That is, the customer may have an account with the computing resource service provider 114 and have an associated account identifier that associates the customer with the hosts 112. Security roles and policies associated with this account identifier enable the customer to make requests, through a computing device (e.g., client 102), to perform various administrative functions such as launching the service and/or other applications within hosts 112 provided by the computing resource service provider 114.

In many imperative object-oriented programming languages, "dot" (.) notation indicates the invocation of a method (callee) by a calling routine (caller); e.g., "object. method( )" Invocation of a called method generally occurs within the caller's processing thread. Although invocation within the same thread minimizes the time (latency) between calls, it requires both the caller and callee to run on the same processor and restricts application scalability. The present disclosure augments dot notation (which is treated as "low latency" method invocation) with the additional concept of "best-effort" method invocation and its application through the use of "latency notation." As noted, other augmentations to other syntaxes that accomplish a similar effect to the latency notation described herein are also contemplated as being within the scope of the present disclosure.

As described in the present disclosure, best-effort method invocation allows a developer to specify that a method may be invoked in a manner other than in-thread (or in-process). For example, the method could be invoked to execute within a separate thread as an asynchronous method invocation. In such implementations, the hosts 112 represent the separate threads. Asynchronous method invocation is a technique that doesn't block the calling thread while waiting for a reply. Instead, the calling thread is notified when the reply arrives. In most programming languages a called method is executed synchronously; i.e., in the thread of execution from which it is invoked. If the method needs a long time to completion (e.g., because it is loading data over the internet), the calling thread is blocked until the method has finished. When this is not desired, it is possible to start a "worker thread" and invoke the method from there. Asynchronous method invocation augments a potentially long-running ("synchronous") object method with an "asynchronous" variant that returns immediately, along with additional methods that make it easy to receive notification of completion or to wait for completion at a later time. It is contemplated, however, that best-effort/low latency notation and invocation can apply to both synchronous and asynchronous method invocation.

As another example, the method could be invoked to run within a separate thread pool within the same virtual machine. A thread pool consists of a number of threads, pre-created to perform a number of tasks concurrently. The number of threads is typically tuned to the computing resources available to handle tasks in parallel (processors, cores, memory) while the number of tasks depends on the problem and may not be known upfront. Multiple thread pools provide a mechanism for accommodating dissimilar types of tasks. For example, one might use one thread pool for high-volume, short-lived tasks and a separate pool for lower volume, long-running tasks.

As yet another example, the method could be invoked to run on a separate virtual machine. In such an implementation, the hosts 112 represent the separate virtual machines. A virtual machine is a physical server virtualized at the operating system level, enabling multiple isolated and secure virtualized servers to run on a single physical server. Virtual machines provide a complete substitute for the targeted real machine and a level of function needed to execute a full operating system. As part of such an environment, a hypervisor is a piece of computer software, firmware or hardware that creates and runs virtual machines. A computer on which a hypervisor runs one or more virtual machines is called a host, and each virtual machine is called a guest. The hypervisor presents the guest operating systems with a virtual operating platform and manages the execution of the guest operating systems. Multiple instances of a variety of operating systems may share the virtualized hardware resources. A hypervisor uses native execution to share and manage hardware, allowing multiple different environments, isolated from each other, to be executed on the same physical machine.

In the present disclosure, a "container" (also referred to as a "software container") may be a lightweight, virtualized instance running under an operating system. Thus, as yet another example, the method could be invoked to run within a separate container. In such an implementation, the hosts 112 represent separate containers. Workloads within containers are virtualized. However, unlike a virtual machine with a hypervisor that that abstracts an entire hardware computing system within a container's native environment, there is no hypervisor. Instead, a container engine may merely abstract the operating system kernel and enlist a daemon that maintains the compartmentalization between containers while connecting their workloads to the operating system kernel. Consequently, containers can be more efficient than a virtual machine in terms of resource usage. Modern containers often do include minimalized operating systems where their only purpose is to maintain basic, local services for the programs they host, not to project the image of a complete processor space. Examples of systems for managing containers include the Docker container engine and the CoreOS rocket container engine.

As still another example, the method could be invoked to run on a separate physical host, possibly within a virtual machine running under a hypervisor on that separate physical host. Note that, typically, the more removed the invoked method is from the consuming thread, the greater the latency between the caller and callee (e.g., invoking the method on a separate physical host introduces latency due to network overhead), but presents advantages of scalability. Scalability is the capability of a system, network, or process to handle a growing amount of work, or its potential to be enlarged in order to accommodate that growth. For example, it can refer to the capability of a system to increase its total output under an increased load when resources are added. Scaling horizontally involves adding more nodes to (or removing nodes from) a system, such as adding a new computer to a distributed software application. An example might involve scaling out from one web server system to three. System architects may configure hundreds of small computers in a cluster to obtain aggregate computing power that often exceeds that of computers based on a single traditional processor.

Scaling vertically includes adding resources to (or removing resources from) a single node in a system, typically involving the addition of CPUs or memory to a single computer. Vertical scaling often enables systems to use virtualization technology more effectively, as it provides more resources for the hosted set of operating system and application modules to share. Application scalability refers to the improved performance of running applications on a scaled-up version of the system. Best-effort suggests that, based upon cost, scalability, or availability concerns, the invoked method should achieve a balance between speed and scalability.

Best-effort invocation acknowledges a trade-off between low-latency (which may involve the need for a powerful computing resource—vertical scaling) and the ability to distribute the computing across multiple resources—horizontal scaling. That is, by distributing method execution of an application among multiple computing resources, the overall environment may be able to accommodate higher throughput. Best-effort invocation may also reflect resource availability. For example, in the event of a resource failure within the environment, methods could be redeployed to alternative locations. Latency notation allows a developer or systems architect to declare within the application code that a low-latency method invocation is more important than cost or scalability or vice versa.

In the present disclosure, latency notation is introduced as a manner by which a developer can express a preference or requirement for either low latency or for best effort. In several programming languages (e.g., Java, C+, C++, C#, etc.), dot notation is used for method invocation. This disclosure refers to "arrow" notation (>), to express an intent to invoke a method that may, but is not required to, execute within the invoker's thread; e.g., "object>method( )" Also referred to as "best-effort" invocation, the "arrow" notation allows a developer to specify that the method may be invoked in another thread, possibly on another computer. It must be noted, however, that best-effort invocation, as described in the present disclosure, is not limited to languages that use dot notation, and that the same concept of indicating "best-effort" in program code can be applied to languages that use other approaches (e.g., Objective-C, Smalltalk, bracket notation, PHP Hypertext Preprocessor (PHP), Perl, OCaml, command line-of-site (CLOS), Advanced Business Application Programming (ABAP), common business-oriented language (COBOL), etc.) to invoke methods.

As noted, although such an invocation may incur higher latency, invoking the method on a separate thread allows greater scalability. In embodiments, if a developer specifies "best-effort" invocation, the system of the present disclosure can determine where to invoke the called method. As a result, the called method may be invoked within the same thread or on the same computer as the calling method, but it is not required to be. Also note that although this disclosure refers to an "arrow" notation, it is contemplated that a different symbol could be used in various embodiments. Furthermore, although the disclosure refers to low-latency and best-effort invocations, an embodiment might include other invocations (e.g., medium-latency, low-to-medium-latency, etc.), each with their own corresponding symbol for notation.

Figure 2:
FIG. 2 shows an illustrative example of latency-annotated application code in accordance with an embodiment.

FIG. 2 shows an illustrative example of latency-annotated application code 200. The source code contains three classes, "A" 202, "B" 216, and "C" 222. Class "A" contains two methods, "a1( )" 204 and "a2( )" 210. Class "B" contains a single method, "b1( )" 218. Class "C" contains a single method "c1( )" 224. Note that within class A, method a1( ) invokes method b1( ) twice. The first invocation of b1( ) by A.a1( ) 206 uses dot notation to specify low latency ("B.b1( )") while the second invocation of b1( ) 208 uses arrow notation to specify best-effort ("B>b1( )"). Within class B, method "b1( )" 218 invokes method c1( ) 220 specifying best-effort. Finally, method "A.a2( ) 210 invokes method c1( ) 214 specifying best-effort ("C>c1( );" within a "for-loop" 212. A for-loop is a control flow statement specifying iteration, which allows enclosed code to be executed repeatedly. In the example, the c1( ) method will be executed five times.

The current disclosure involves the extension of an existing programming language to include "best-effort" notation. In a typical object-oriented imperative language, such as Java, C+, C++, or C#, the "dot" notation exists to invoke a method. In some embodiments, latency notation is an augmentation to an existing object-oriented imperative language. In another embodiment of latency notation, a new programming language is based around latency notation. As part of such an embodiment, the new language might include the "arrow" notation to indicate "best effort." Still another embodiment might include the implementation of best-effort invocation through a software development kit (SDK). In this embodiment, an application programming interface (API), of an existing SDK might be extended to introduce a "best effort" invoke method call (i.e., in lieu of the arrow notation), in addition to a low latency invoke call.

Figure 3:
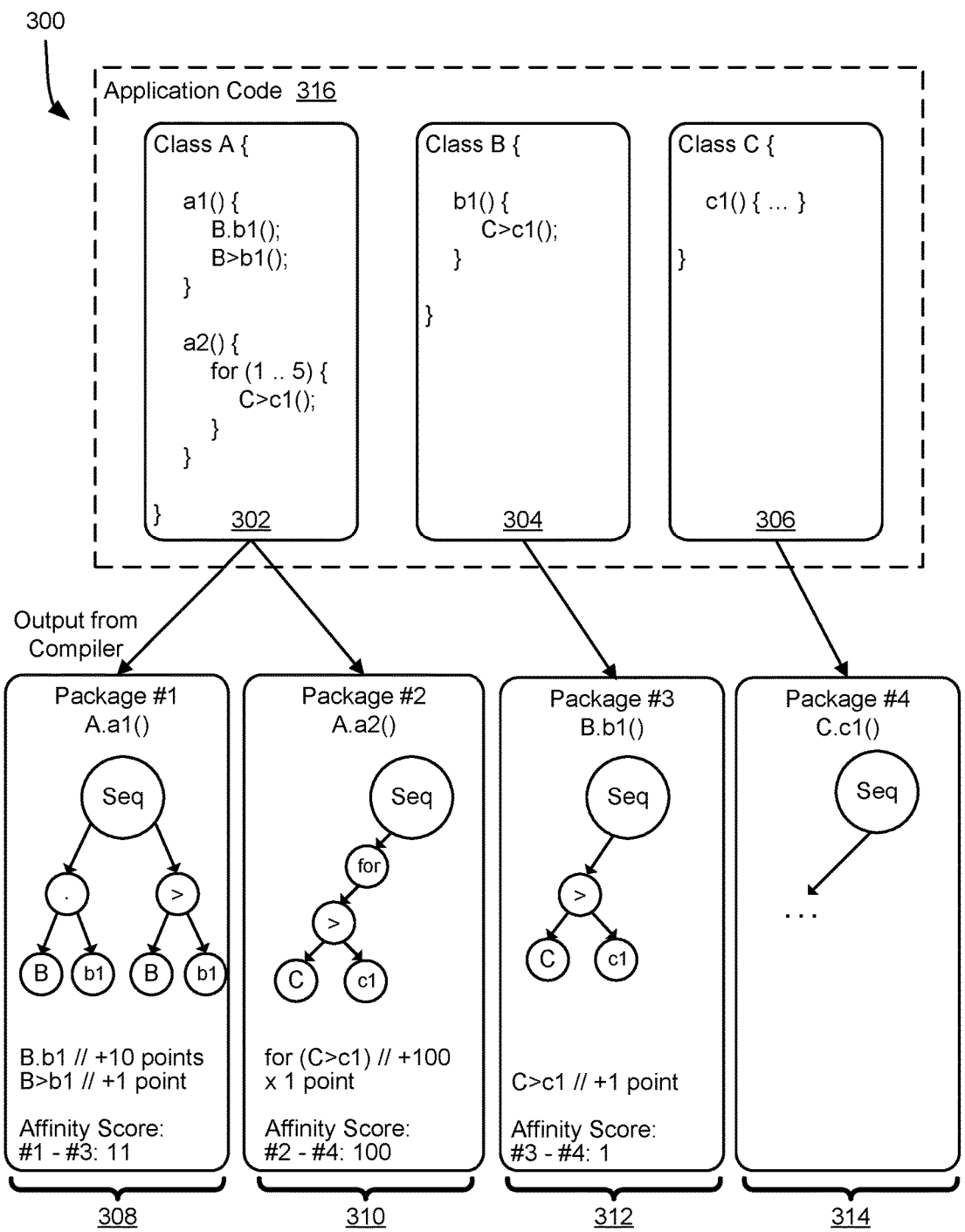
FIG. 3 is a diagram illustrating a manner in which latency-annotated application code may be packaged for deployment in accordance with an embodiment.

FIG. 3 illustrates an example 300 of latency-annotated application code 316, such as the latency-annotated application code 200 of FIG. 2, as compiled by a host-agnostic compiler, such as the host-agnostic compiler 106 of FIG. 1, and packaged for deployment, in accordance with an embodiment. Methods a1( ) and a2( ) of class "A" 302 have been compiled into package #1 308 and package #2 310, respectively. Method b1( ) of class "B" 304 has been compiled into package #3 312. Finally, method c1( ) of class "C" 306 has been compiled into package #4 314.

In the present disclosure, a "host-agnostic compiler" (compiler) may refer to a compiler that generates an application as separate packages that may be deployed on the same or different hosts. That is, each package could execute in a single thread, or could alternatively be deployed to a separate thread, a separate thread pool, a separate virtual host, or separate physical host. The developer can influence package deployment by specifying the latency requirements for invoked methods, and the compiler is able to recognize those requirements.

The compiler takes, as an input, the latency-annotated application code 316 that the developer has written and calculates the number of times that a particular method calls another method and the developer-specified concern with latency; i.e., best-effort or low-latency method invocation. As a result, the compiler is able to determine the affinity between functions and, subsequently, the affinity between packages. For example, if a method A calls a method B multiple times (e.g., 5 times, 10 times, etc.), method A can be said to have a high affinity to method B. Alternatively, if there also exists a method C that is never called by method A, methods A and C can be said to have a low affinity. The compiler's job is to establish the affinity between methods.

The compiler first performs static analysis on the code to construct an abstract syntax tree (AST), also known as a method call graph. The AST is a tree representation of the lexical/syntactical structure of the blocks and statements of source code as written in a programming language. Each node of the tree denotes a construct occurring in the source code. As part of the static analysis, while the compiler calculates the affinity between methods, it may also calculate the affinity between the packages containing those methods. The compiler may perform two passes: during a first pass, the compiler may catalog all public methods in all classes within a project or namespace to a shared dictionary and generate a unique reference key for each method; during a second pass, the compiler may construct an AST of public methods for all classes. In embodiments, references to methods in external classes need not be resolved; instead, such external references may be replaced with "method proxy" marker nodes. A "method proxy" marker node may contain enough information to later resolve to the originating method (e.g., the unique reference key established in the first pass).

The compiler further attempts to calculate the amount of time that a method is potentially spending calling other methods by assigning different weights to low-latency and best-effort invocations of methods. During compilation, affinity among methods may be scored as follows: a "traditional," low-latency "." method invocation may be scored with a first value (e.g., 10) and a "best-effort," ">" method invocation may be scored with a second value (e.g., 1). Methods invoked within loops present a different challenge as it may be difficult to determine, before runtime, how many times a method within a loop may be invoked. Consequently, a method invocation (either "." or ">") within a loop may have its score incremented or multiplied by a third value (e.g., 100) in order to more heavily weight method invocations within loops and increase their likelihood of proximity to the calling method. Alternatively, a best-effort method invocation might be scored with a higher value (e.g., 100) than a low-latency method invocation.

The compiler may then compute an affinity score for each pair of packages containing related methods. After all the inter-method scores are calculated, the compiler will then sum those scores to determine affinity scores between any pairs of packages possessing method dependencies. In the example depicted in FIG. 3, low-latency calls (e.g., dot notated methods) are costed at 10, best-effort calls are costed at 1, and calls that occur within a loop have their cost multiplied by a factor of 100. The cost of a loop may not be affected by the number of iterations in the loop. In the embodiment depicted in FIG. 3, source code equivalent to classes A 202, B 216, and C 222 of FIG. 2 have been compiled and placed in four packages. The syntax tree for package #1 308 shows the decomposition of the source code 302 as it might be processed by the compiler and the differentiation between the "." and ">" operators. Using a cost of 10 for a low-latency call and a cost of 1 for a best-effort call, method a1( ) which has been placed in package #1, makes one low-latency call and one best-effort call to method b1( ), which in turn has been placed in package #3. The single low-latency call and single best-effort call result in affinity scores of 10 points for the low-latency call and 1 point for the best-effort call. Adding these scores together results in a total affinity score of 11 between packages #1 and #3. Hypothetically, if method a1( ) also called method c1( ) affinity scores would also exist between packages #1 and #3 as well as packages #1 and #4.

Similarly, the syntax tree for package #2 310 shows the decomposition of the source code 302 as it might be processed by the compiler and the recognition of the ">" operator. Method A.a2( ) in package #2 makes a single best-effort call to method c1( ) in package #4. However, as visible in the source code and reflected in the syntax tree, this call is within a loop so, in the embodiment depicted in 310, the affinity score for the best-effort call is multiplied by 100, resulting in an score of 100 between packages #2 and #4.

The syntax tree for package #3 312, consistent with source code 304, indicates that method B.b1( ) in package #3 makes a single best-effort call to method c1( ) in package #4 that results in an affinity score of 1 between packages #3 and #4. Finally, the syntax tree for package #4 314, consistent with source code 306, has been abstracted only to provide affinity targets for packages #2 and #3. Class C only represents a stub package referenced by other packages.

Note that these particular values are given for illustrative purposes only, and it is contemplated that different values may be used in computing the affinity score. For example, in an alternate implementation, low-latency calls might increment the affinity score by 20, best-effort calls might increment the affinity score by 3, and calls made within an iterative statement, such as a "while" loop, a "for" loop, or any other control flow statement that allows code to be executed repeatedly based on a given condition, might be multiplied by 50. In some implementations, the multiplier may be based at least in part on the type of iterative statement used. For example, calls made within for loops may have their scores multiplied by 100, while calls made within while loops may have their scores multiplied by 20. The higher the method/method or package/package affinity, the more likely that the methods and packages will be deployed to the same host or thread. The affinity score indicates a target proximity between packages deployed in the computing environment. Alternatively, an affinity score might be calculated in which the lower the method/method or package/package affinity, the more likely that the methods and packages will be deployed to the same host or thread.

Figure 4:
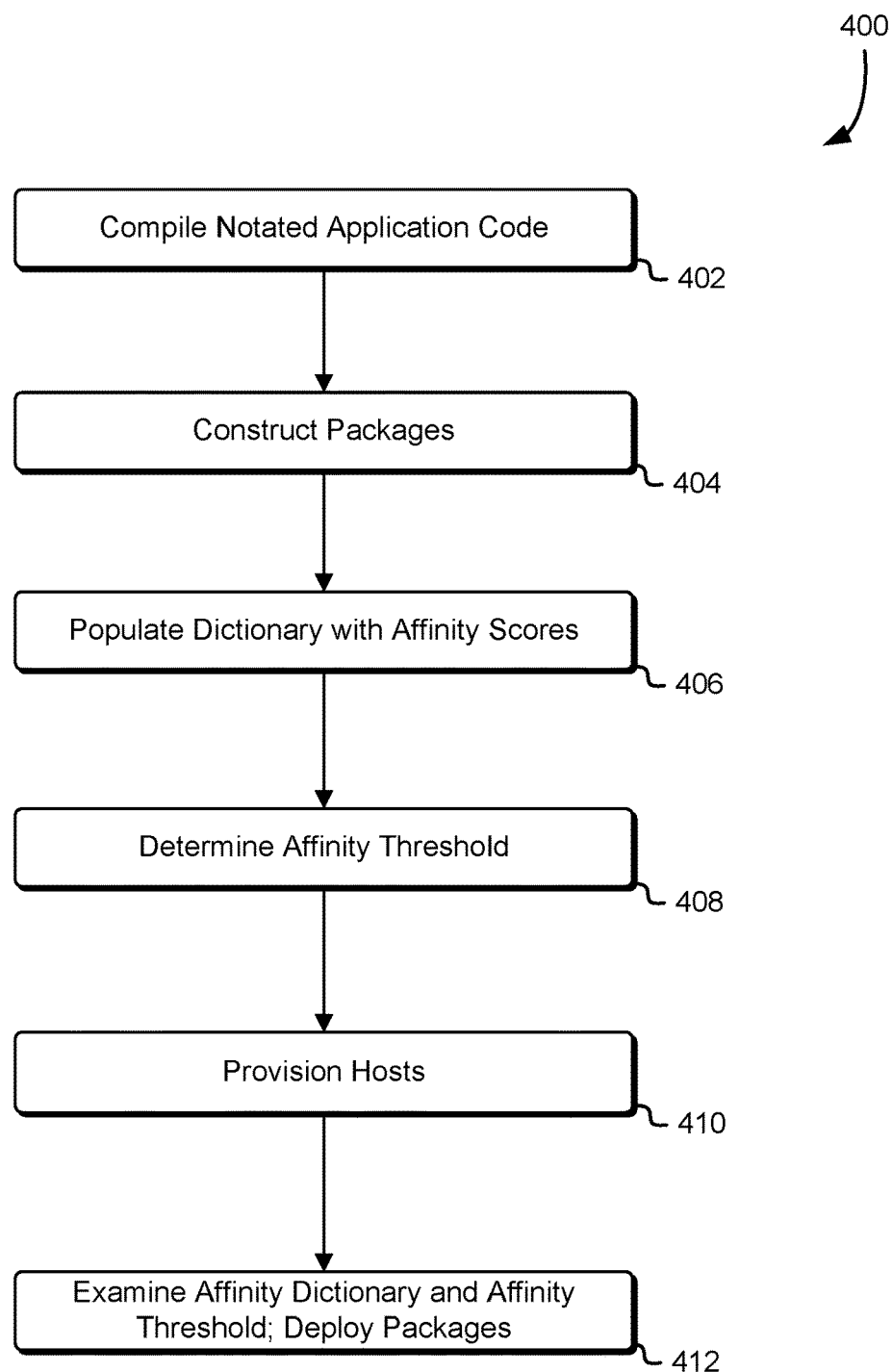
FIG. 4 is a flowchart that illustrates an example of compiling latency-annotated application code in accordance with an embodiment.

FIG. 4 is a flowchart illustrating a summary process 400 of the compilation and deployment of latency-annotated application code. The summary process 400 includes a series of operations wherein source code may be consumed, distinct methods may be identified, latency requirements may be determined, an AST and method dictionary may be constructed and later queried, virtual hosts or containers may be created, latency requirements may be considered, and packages may be deployed. Some or all of the summary process 400 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

In 402, the latency-notated application source code, such as 104 in FIG. 1, is compiled by a host-agnostic compiler, such as 106 in FIG. 1. This source code may have been notated using either the "dot" or "arrow" notation to reflect the developer's intent for either low-latency or best-effort method clustering. The compiler may consider the notation, as well as the package clustering strategy, which may include values to assign a low-latency method invocation request, a best-effort method invocation request, and a multiplier to apply to the score for any method invocation that occurs within a loop. During compilation, an affinity dictionary is created or updated and the methods recorded within. Each time a method is encountered, the dictionary is checked to determine if the method exists within the dictionary, and if not, the method is added, along with its affinity score to its calling method.

In 404, as a result of the compilation, a set of packages, such as 108 in FIG. 1, may be created. The granularity of the packages may be driven by the package clustering strategy. One example of the granularity of the packages might be one method per package. Further, each package might be wrapped within a single container. As the packages are constructed, inter-package affinity scores are determined by summing the scores of the included inter-method scores. Then, in 406, the affinity scores of the packages are recorded in the affinity dictionary. More detail regarding the operations of 402-406 can be found in the description of the compilation process 500 of FIG. 5.

In 408, an executor, such as 110 in FIG. 1, determines the affinity threshold or the set of affinity thresholds. In 410, the executor next examines the packages and the package clustering strategy, along with the affinity threshold, and allocates one or more hosts to receive the packages. The hosts may be allocated in a variety of ways, such as instantiating new threads within an existing thread pool, instantiating a new container, instantiating a new thread pool within an existing virtual machine, instantiating a new virtual machine under a hypervisor on an existing physical server, instantiating a new virtual machine under a new hypervisor on a new physical server, or utilizing an existing thread, thread pool, container, virtual machine, or physical server to host the package(s).

Finally, in 412, the affinity dictionary and threshold are again consulted and packages are deployed to the provisioned hosts. The package deployment may be constrained or controlled by the number and type of hosts available to the deployment administrator. More detail regarding the operations of 408-412 can be found in the description of the process 600 of FIG. 6. Note that one or more of the operations performed in 402-412 may be performed in various orders and combinations, including in parallel. For example, hosts could be provisioned 410 concurrently with the deployment of packages 412.

Figure 10:
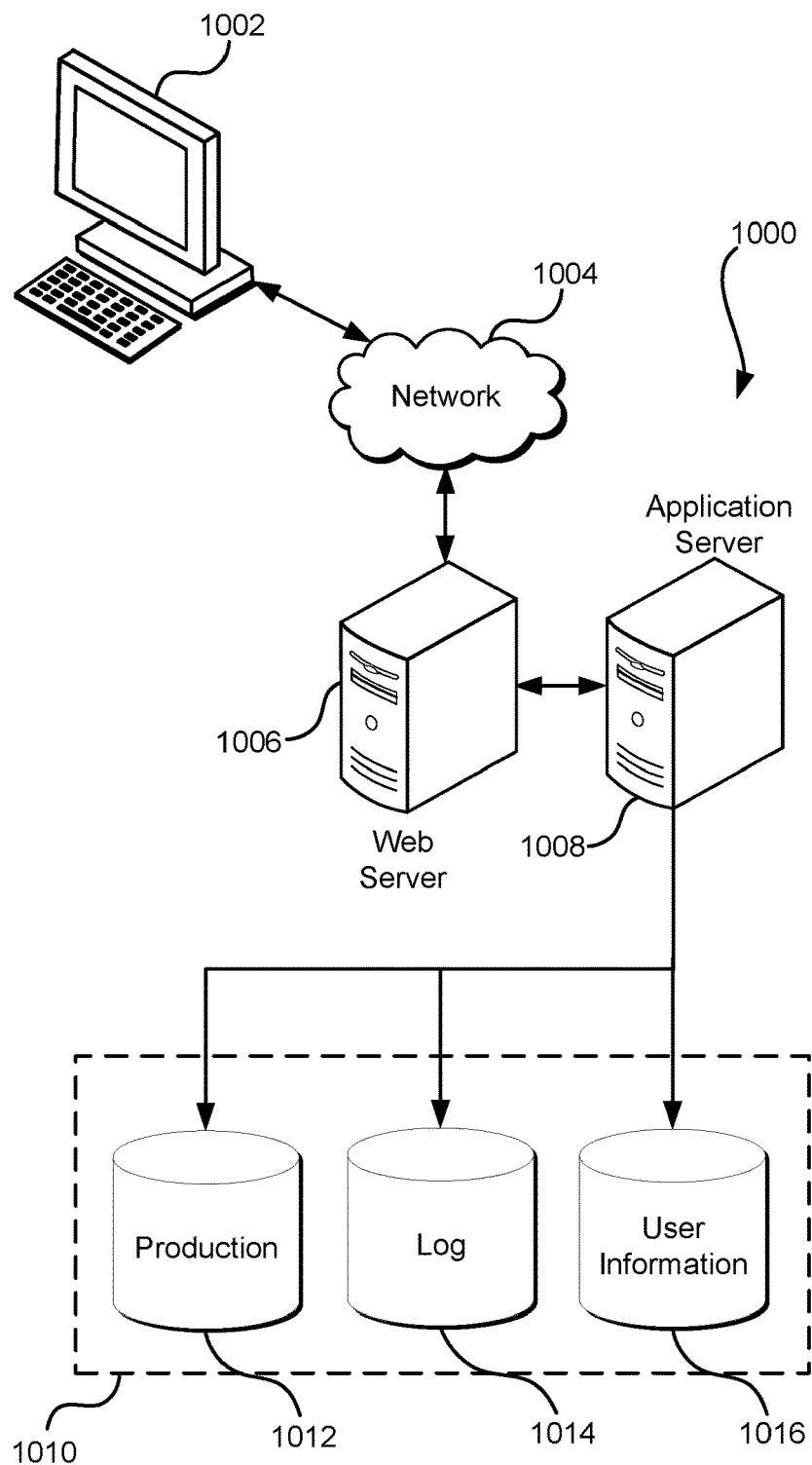
FIG. 10 illustrates an environment in which various embodiments can be implemented.

Some or all of the summary process 400 may be performed by any suitable system, such as a server in a data center, by various components of the example environment 1000 described in conjunction with FIG. 10, such as the web server 1006 or the application server 1008, by multiple computing devices in a distributed system of a computing resource service provider, or by any electronic client device such as the electronic client device 1002.

Figure 5:
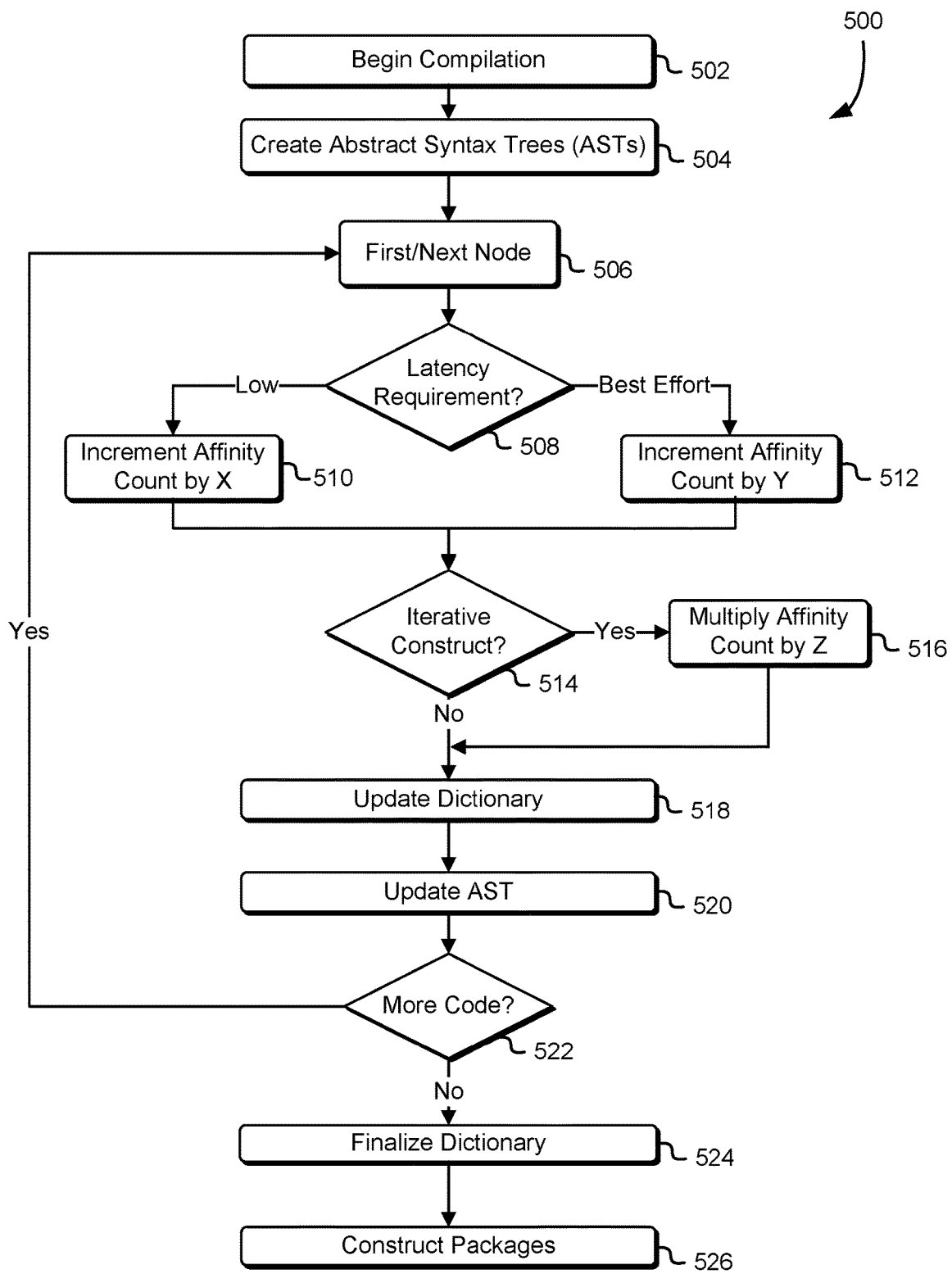
FIG. 5 is a flowchart that illustrates an example of deploying compiled latency-annotated application code in accordance with an embodiment.

FIG. 5 is a flowchart illustrating an example 500 of a process for compiling latency-annotated application code by a host-agnostic compiler, such as the host-agnostic compiler 106 of FIG. 1, in accordance with various embodiments. Some or all of the compilation process 500 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of compilation process 500 may be performed by any suitable system, such as a server in a data center, by various components of the example environment 1000 described in conjunction with FIG. 10, such as the web server 1006 or the application server 1008, by multiple computing devices in a distributed system of a computing resource service provider, or by any electronic client device such as the electronic client device 1002. The compilation process 500 includes a series of operations performed by a compiler, such as the host-agnostic compiler 106 of FIG. 1, wherein source code is consumed, distinct methods are identified, latency requirements are determined, and an AST and method dictionary are constructed.

In 502, the system may receive a request to commence compilation of source code, such as the latency-notated application code 104 of FIG. 1. In some implementations, the compilation may be distributed among multiple servers such that each server performs a portion of the compilation. In other implementations, multiple instances of the compiler may execute within a single server. During the compilation process 500, in 504, ASTs for the methods may be constructed and in 506, the ASTs of the source code (e.g., latency-notated application code 104 of FIG. 1) may be walked to determine methods or functions. If this is the first package compiled, an affinity dictionary may also be initialized. Thus, in 506, information about the first (or next) node corresponding to a method call is obtained.

Next, in 508, the latency requirement of the method call is determined. A low-latency invocation; e.g., "class. method," results in X points added to the affinity score between the calling and called methods 510. For example, X might be 10 in a particular implementation, but it is contemplated that this value could be different in other implementations. Conversely, a best-effort invocation; e.g., "class>method," results in Y points added to the affinity score between the calling and called methods 512. For example, Y might be 1 in a particular implementation, but it is contemplated that this value could be different in other implementations. Note that it is contemplated that, rather than adding a value, other operations (e.g., exponential, factorial, logarithmic, multiplicative, etc.) may be used for computing the affinity score, depending on the implementation.

In 514, the code is further inspected to determine if the called method is within a loop or other iterative construct. If such a construct is found, the affinity score for the called method will be multiplied by Z points 516. For example, Z might be 100 in a particular implementation, but it is contemplated that this value could be different in other implementations. Otherwise, the affinity score will remain at its low-latency or best-effort value. Note that this is illustrative only, and in alternate implementations an iterative construct could result in an addition, division, factorial, exponential, logarithmic, or other operation. For example, in an alternative implementation, such as that described above in which a lower affinity indicates a higher preference that the packages should be deployed to the same host or thread, encountering an iterative construct might result in the division of the affinity score by Z points 516 rather than multiplication or addition.

In 518 the affinity scores are updated in the dictionary. The affinity dictionary may refer to a single, global reference containing the affinity scores between the different methods and packages. If the system performing the compilation process 500 detects a reference to a function or method, the system will query the dictionary to determine if the function/method has been previously encountered in the compilation. If the method has not been previously encountered in the compilation process 500, the new method will be added to the dictionary. Alternatively, if a called method has been previously encountered, the affinity score will be incremented. In this way, the compiler calculates the number of times that a method is dependent on other methods. Then, in 520, the AST is updated to reflect the syntax structure of the application source code.

In 522, the compiler checks for the existence of additional code. If additional code exists, the compiler returns to 506 to repeat the process of looking for methods and recording/adjusting the affinity score between the calling and called methods. Otherwise, if there is no additional code to process, 524 finalizes the dictionary and makes it available for subsequent processing by the executor. Finally, 526 constructs the packages and puts them in a form consumable by the executor. A package is a mechanism of encapsulating a group of classes (including methods), interfaces and sub packages that provides access protection and name space management. During this step, the affinity scores between methods are aggregated to determine affinity scores between packages. Note that one or more of the operations performed in 502-526 may be performed in various orders and combinations, including in parallel. For example, the operations performed in 510 or 512 could be performed prior to or in parallel with the operations performed in 516. Packages may also be wrapped in individual containers.

Figure 6:
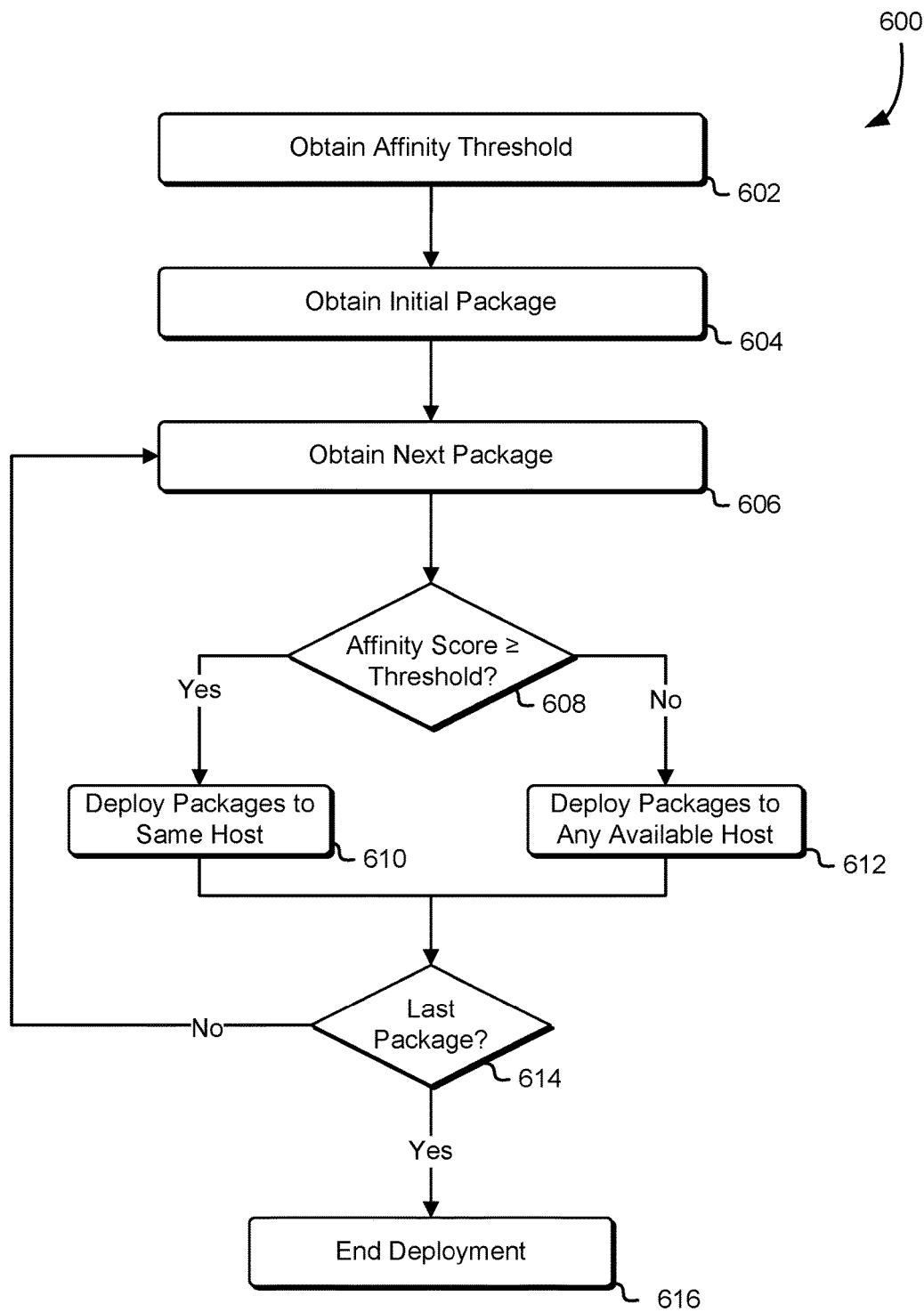
FIG. 6 shows an illustrative examples in which compiled latency-annotated code is deployed in accordance with various affinity thresholds.

FIG. 6 is a flowchart illustrating an example 600 of a process for deploying packages containing compiled latency-annotated application code. The process 600 includes a series of operations wherein an AST and method dictionary may be queried, containers or virtual hosts may be created, latency requirements may be determined, and packages may be deployed. This process 600 could be executed by an executor, such as the executor 110 of FIG. 1, in accordance with various embodiments. Further, some or all of the process 600 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

During deployment of the application, the affinity scores and predetermined thresholds may be used by an executor, such as the executor 110 of FIG. 1, to distribute the packages to appropriate hosts. In embodiments, the executor is a runtime, a managed service, with the ability and responsibility to dispatch new hosts as necessary. As the application is deployed, the executor may examine the affinity dictionary and the packages and, based on the affinity scores, determine whether one host is sufficient or if the executor needs to dispatch additional hosts. It will then apply the clustering strategy to determine what packages to deploy to the various hosts.

In 602, the executor receives an affinity threshold. This affinity threshold may be defined by an administrator of the customer's computing environment, or may be dynamically established, such as by executing an algorithm that incorporates factors including compute budget, physical host memory and processor capacity, industry and computing resource service provider (e.g., the computing resource service provider 114 of FIG. 1) best practices and contractual agreements. The affinity threshold might also be derived based at least in part on availability of computing resources (e.g., from the number of hosts and available computing power available to execute the packages). For example, hosts with greater computational power might be assigned a greater proportion of packages than hosts with less computational power. The affinity threshold might also be derived based on a pricing component specified by the customer (e.g., reflecting a willingness of the customer to pay more for reduced latency, or, alternatively, a preference by the customer to pay less for the constraint of more distributed resources). Further, while the affinity threshold may be a single value that controls the recruitment or creation of containers or virtual hosts, it may also consist of an array of values that further control the recruitment or creation of threads or thread pools, the recruitment of additional physical hosts, or the recruitment of other physical or virtual computing resources. Moreover, the affinity threshold may be dynamically determined based on any combination of the above criteria or similar factors. In this example, an affinity score above the affinity threshold is assumed to result in low-latency deployment.

In 604, the executor receives an initial application package followed by an additional application package 606. The executor then examines the dictionary to determine the affinity score of the package with any previously deployed packages. In 608, the executor then compares the inter-package affinity score with the affinity threshold or thresholds specified by the deployment administrator or otherwise established.

During deployment, the executor examines the AST and the packages and, based on the affinity scores between the methods and their packages, may determine the number of hosts to dispatch and to which hosts particular packages are deployed. If the affinity score is greater than or equal to the threshold, the executor will attempt to deploy the packages to the same host 610. Alternatively, the packages may be deployed to any host 612. As packages are deployed, the executor updates the dictionary, cross-referencing all methods/classes/packages and the hosts to which they have been distributed. Within a host, additional threshold parameters may determine whether packages are deployed to the same thread, thread pool, container, or virtual host.

In 614, the executor determines if there are additional packages to be deployed and, if so, repeats the process of applying affinity scores. Finally, in 616, the executor completes the application deployment and returns status information to the administrator. Note that one or more of the operations performed in 602-616 may be performed in various orders and combinations, including in parallel. For example, 610 and 612 could be performed in parallel by recording the inter-package affinity scores as packages are obtained by the executor and then deploying all packages in a single operation.

Some or all of process 600 may be performed by any suitable system, such as a server in a data center, by various components of the example environment 1000 described in conjunction with FIG. 10, such as the web server 1006 or the application server 1008, by multiple computing devices in a distributed system of a computing resource service provider, or by any electronic client device such as the electronic client device 1002.

Figure 7:
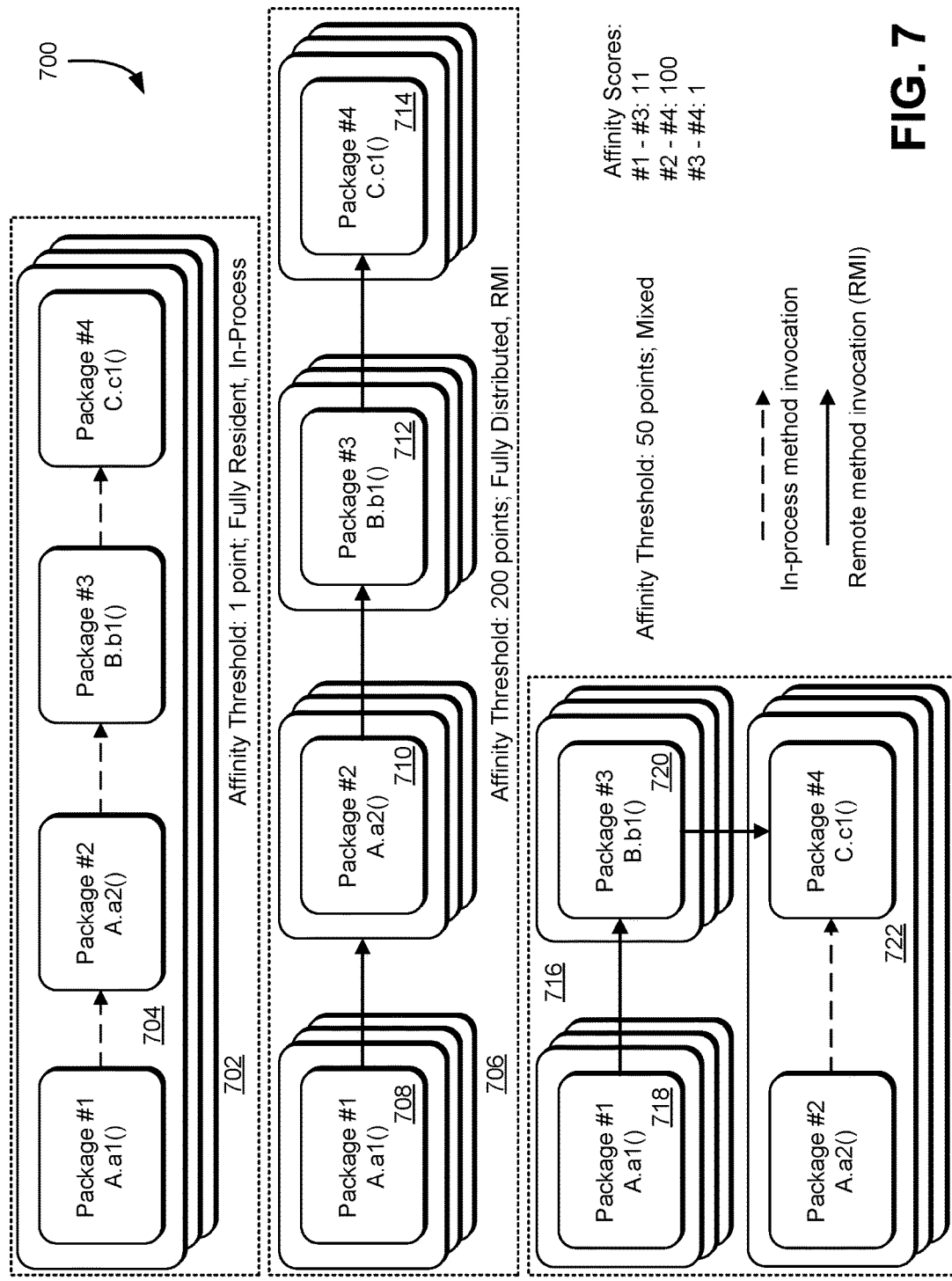
FIG. 7 shows an illustrative example of an overall process for compiling latency-annotated application code and deploying it in accordance with an embodiment.

FIG. 7 shows an illustrative example 700 of various deployments of compiled latency-annotated code. Deployment 702 demonstrates a deployment in which the affinity threshold has been specified as 1. The inter-package affinity score between packages #1 and #3, as disclosed in FIG. 3, is 11. Similarly, the affinity score between packages #2 and #4 is 100. Finally, the score between packages #3 and #4 is 1. In this example, an affinity score above the affinity threshold is assumed to result in low-latency deployment. However, it is contemplated, such as in an alternate implementation described above where high affinity score indicates a preference for best effort, that a score above the affinity threshold may indicate best effort. Because the inter-package affinity scores are all greater than or equal to the affinity threshold, all the packages are deployed to a single host, and method invocation occurs within the same process or thread. Method invocation within the same thread or process may also be referred to as in-process method invocation.

By contrast, remote method invocation (RMI) is a distributed object technology developed for the Java programming language. It is available as part of the core Java application programming interface (API) in which the object interfaces are defined as Java interfaces and use object serialization. RMI permits Java methods to refer to a remote object and invoke methods of the remote object. The remote object may reside on another Java virtual machine, the same host or on completely different hosts across the network. RMI marshals and unmarshals method arguments through object serialization and supports dynamic downloading of class files across networks. While remote method calls typically introduce network overhead and latency, allowing a method to reside on a separate host may offer more granular scalability and require less memory and processor capacity for some (if not all) of the hosts.

Deployment 702 makes use of a single host 704, which may contain multiple processors and sufficient memory to satisfy the requirements of all the packages. However, the second deployment 706 represents a deployment in which, because the affinity threshold has been specified as 200, a value that exceeds all of the inter-package affinity scores, all of the packages have been deployed to separate hosts. Note, however, that the separate hosts all reside within a computing resource service provider; e.g., provider 114 in FIG. 1. It often costs much less to create a system of smaller computers with the equivalent power of a single large host. Further, the incremental cost of expanding an existing distributed system is typically far less than the cost of replacing a single host.

In some cases, the hosts may be of varying sizes. For example, hosts 708-714 may be allocated a varying number of processor cores and memory. More processor cores generally results in greater processing capability (i.e., computing power) for the host. In some embodiments, the use of distinct hosts may allow more efficiency in the overall distributed system.

Finally, the third deployment 716 represents a mixed deployment environment in which packages #2 and #4, because their affinity score of 100 exceeds the threshold of 50, are placed on a single host, whereas package #3 is placed on a separate host from #4 because the affinity score between #3 and #4 (1) is less than the affinity threshold of 50, and package #1 is distributed to yet an additional host because the affinity score between #1 and #3 (11) is also less than the affinity threshold of 50.

For the deployment 716, all three of hosts 718-722 may be independently sized with respect to processor and memory. Packages #1 and #3 may require little capacity in comparison with packages #2 and #4. Accordingly, hosts 718 and 720 may be sized appropriately so as to provide the most cost effective allocation of resources to the computing resource service provider.

Figure 8:
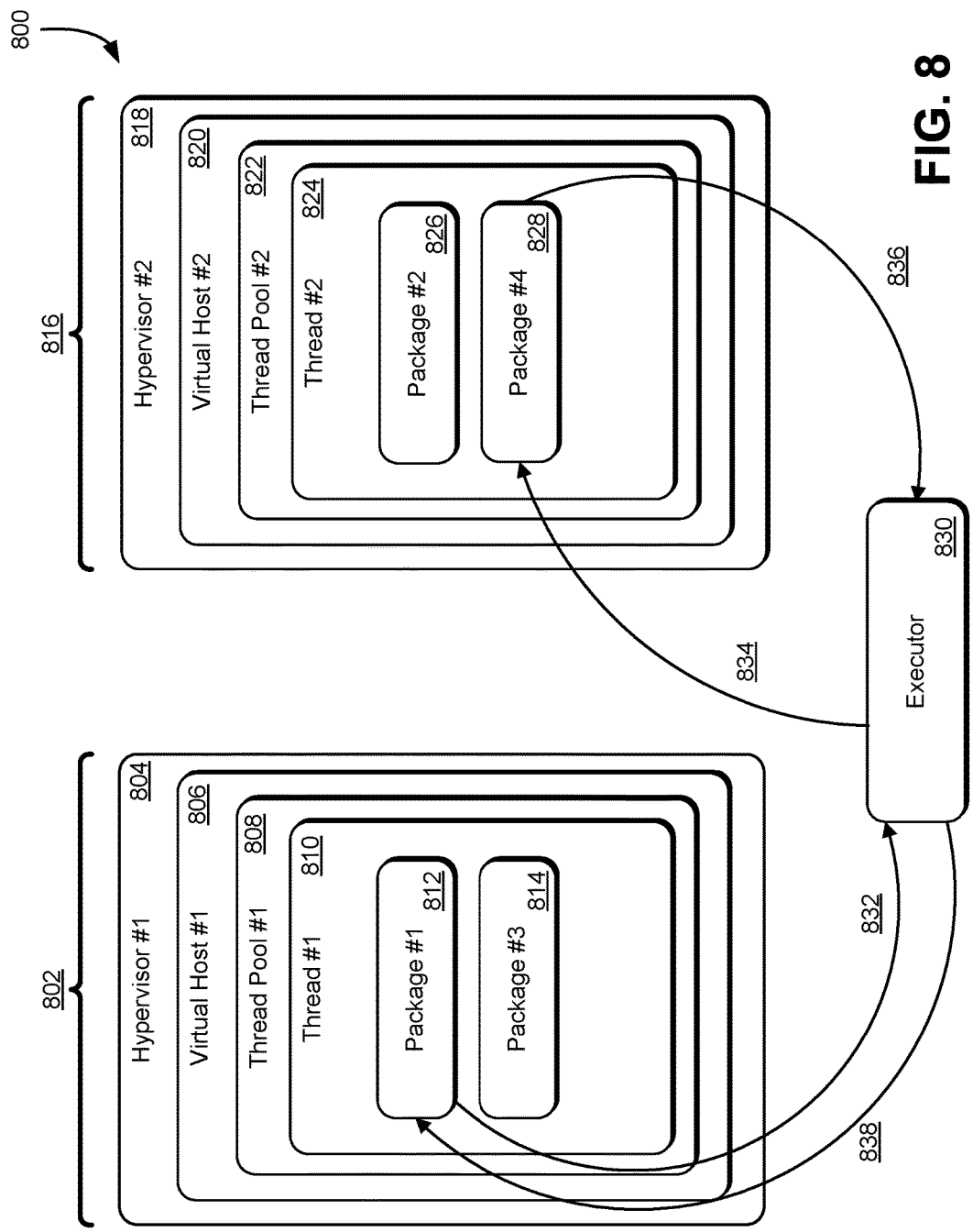
FIG. 8 illustrates an example of the executor passing transient execution context in accordance with an embodiment.

FIG. 8 shows an illustrative example 800 of a deployment of packages by an executor 830, such as the executor 110 of FIG. 1, and the use of the executor to resolve proxy methods. In this example, the affinity threshold has been set to 10 and two physical servers 802 and 816 have been made available. Assuming a sequential deployment of packages, the executor 830 firsts enlists physical server 802 and launches hypervisor #1 804, instructing it to instantiate a virtual host #1 806, with a single thread pool #1 808. The executor 830 then deploys package #1 812 in a single execution thread. Note that this is an illustrative example, and it must be noted that the packages described in the present disclosure may be deployed at various levels of granularity (e.g., to a thread pool, virtual host, hypervisor, physical server, etc.). Moreover, if a host (e.g., thread, thread pool, virtual host, etc.) is already instantiated, in some examples the packages of the present disclosure may be deployed to existing host(s) rather than instantiating new ones.

The executor 830 then addresses package #2. Because there is no affinity between packages #1 and #2, the executor 830 enlists a second physical server 816, launches hypervisor #2 818, and instructs it to instantiate a single virtual host (virtual host #2, 820) with a single thread pool (thread pool #2, 822). The executor 830 then deploys package #2 826 in a single execution thread. Alternatively, the executor 830 might instantiate or enlist a container and deploy package #2 826.

Considering package #3 814, because the affinity score between packages #1 and #3 is 11, which exceeds the affinity threshold of 10, the executor 830 will deploy the package in the same virtual host and thread as package #1 812. Consequently, package #3 814 is deployed to virtual host #1 806 in thread #1 810. A different package clustering strategy and affinity threshold might cause a second thread pool to be created on virtual host #1 806 or even a second virtual host.

Turning to package #4 828, the executor 830 follows a similar decision tree. In this case, however, because the executor 830 is aware that the affinity score between packages #2 and #4, 100, exceeds the affinity threshold of 10, it deploys package #4 to the same thread as package #2. Consequently, package #4 is deployed to thread #2 824, in thread pool #2 822, in virtual host #2 820, under hypervisor #2 818, on physical server 816. Note that the physical servers might also provide and support a container architecture in addition to or in place of virtual hosts.

If a method is invoked within a host, that host will attempt to resolve the dependency by first determining whether the host possesses the package containing the invoked method. As noted above, during compilation, an external reference may be replaced with a "marker" node that acts as a proxy for the method. Such a method proxy marker node may contain enough information to resolve to the reference key for the method in the dictionary. Thus, if the host does not possess the package containing the invoked method (e.g., the invoked method is represented by a method proxy), the host will make a request to the executor to obtain the package location and pass any transient (i.e., locally saved for the duration of the request) execution context. In the present disclosure, "execution context" may refer to information about the computing "environment" in which a function executes, such as an identity against which permissions to execute statements are checked, variable scope, function arguments and values, and so on.

In turn, a host will listen for an invocation command for a method and, upon receipt, traverse its AST to resolve any method proxies. Upon receipt of a request from a host for a particular method, the executor 830 determines which host(s) possess(es) the package containing that method and passes the transient execution context. Here, after determining that the virtual host #1 806 does not possess B.b1( ) the virtual host #1 806 will place a service request 832 to the executor 830, along with the transient context for B.b1( ). Subsequently, the executor 830 will query its dictionary to determine that virtual host #2 820 possesses the desired method. The executor 830 will then pass 834 the execution context to virtual host #2 820, which will successfully resolve the location of the method and cause the method to execute the request. Upon completion of execution of the method, the method results are returned to the executor 830, which then returns them to the caller. Here, virtual host #2 820 will execute B.b1( ) using the passed execution context, return the results 836 to the executor 830, which will, in turn, return the results 838 to A.a1( ) on virtual host #1 806. The executor 830 may rely on recursion to involve additional hosts and resolve their respective method proxies.

Although "best-effort" deployment may introduce inter-call latency, such a deployment may be more scalable because it allows additional computers to participate in the execution of the program. Further, because each computer may not need to be as powerful, the overall cost of the system may be reduced.

Note that in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

Figure 9:
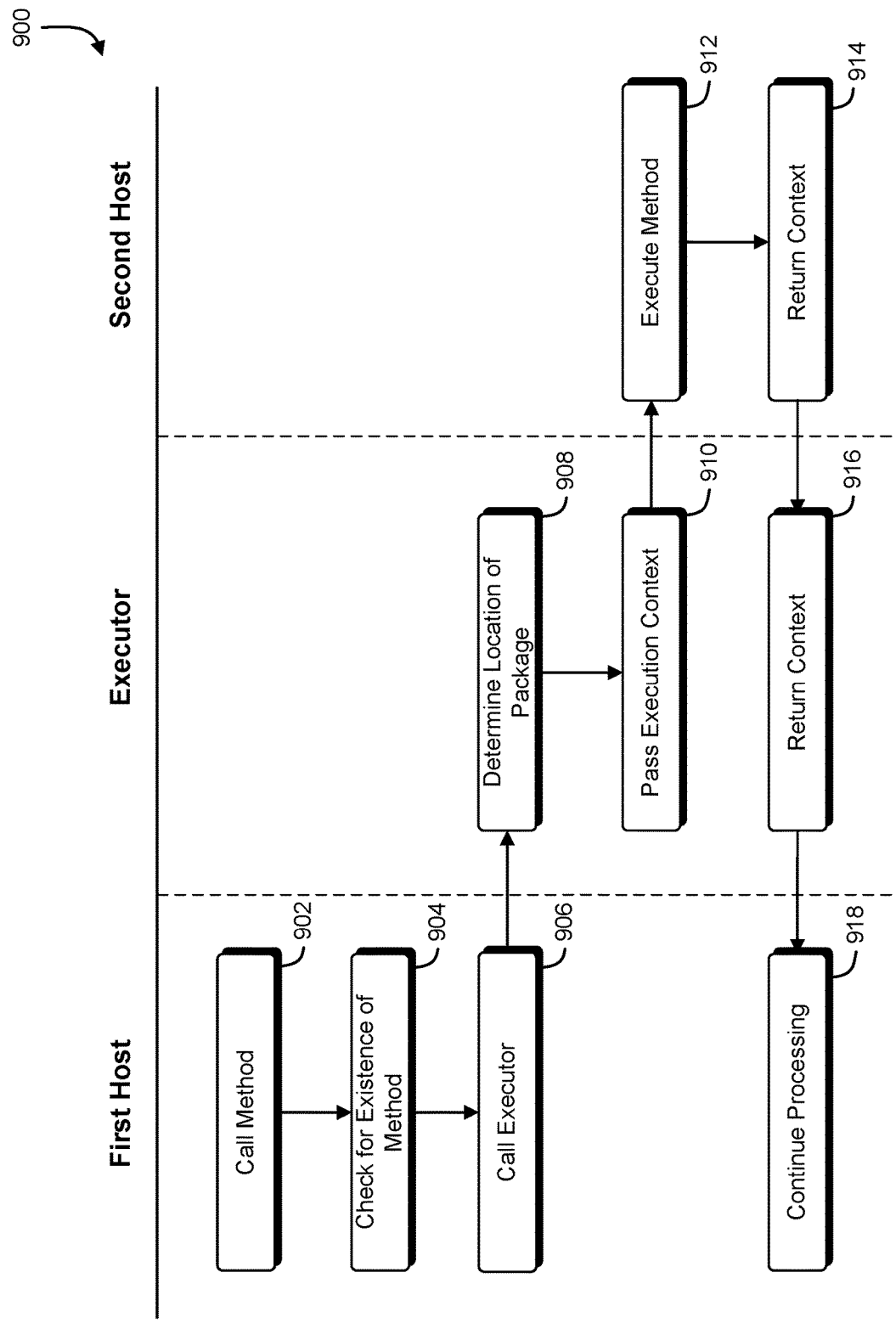
FIG. 9 is a swimchart that illustrates an example of the executor passing transient execution context in accordance with an embodiment.

FIG. 9 is a swim diagram illustrating an example 900 of a process in which a method calls another method. The process 900 includes a series of operations wherein an AST and method dictionary may be queried and an executor may be enlisted. Some or all of the process 900 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

In 902, a method running within a thread in a thread pool on a host on a physical host places a call to another method. In 904, the local host determines if the called method is available locally. This determination may take the form of a query to the affinity dictionary. Alternatively, the first host may attempt to invoke method locally, and its failure might indicate the absence of the method on the local host. As another embodiment, the first host may maintain a cache of methods and locations, minimizing the number of queries to the dictionary for co-resident packages.

If the called method is unavailable on the local host, the system performing the process 900 proceeds to 906, whereupon a request is placed to the executor, such as the executor 110 of FIG. 1, along with the execution context from the calling method (e.g., the service request 832 of FIG. 8). In 908, the executor examines the affinity dictionary and determines that the package containing the called method resides at the second host. In 910, the executor passes the execution context to the second host, such as the forwarded request 834 of FIG. 8.

In 912, the second host executes the called method using the passed execution context. In 914, the second host will return the execution context, such as the returned context 836 of FIG. 8, which now contains the execution result of the second method call, to the executor. Finally, in 916, the executor will return the execution context, e.g., 838 of FIG. 8, to the calling method, which continues its processing thread 918.

Some or all of process 900 may be performed by any suitable system, such as a server in a data center, by various components of the example environment 1000 described in conjunction with FIG. 10, such as the web server 1006 or the application server 1008, by multiple computing devices in a distributed system of a computing resource service provider, or by any electronic client device such as the electronic client device 1002.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network, and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the electronic client device 1002 and the application server 1008, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes, and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update, or otherwise process data in response thereto. The application server 1008 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the electronic client device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the example environment 1000 in FIG. 10 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   under the control of one or more computer systems configured with executable instructions,
   obtaining application source code for a software application to be deployed in a computing environment;
   identifying a method caller and a called method within the application source code, the method caller being a method from which the called method is called;
   determining, from the application source code, that the called method, as a result of a call from the method caller, is to execute in accordance with latency criteria;
   determining an affinity value for the called method based at least in part on the latency criteria;
   calculating, based at least in part on the affinity value, an affinity score between the method caller and the called method, the affinity score indicating a target proximity between packages deployed in the computing environment;
   outputting a first package for the method caller and a second package for the called method, the first package including the affinity score between the method caller and the called method; and
   deploying the first package and the second package in accordance with the affinity score.

2. The computer-implemented method of claim 1, wherein deploying the first package and the second package includes:
   deploying the first package to a first host;
   determining, as a result of the affinity score being at a value relative to an affinity threshold, that the host that meets the latency criteria is a second host different from the first host; and
   deploying the second package to the second host.

3. The computer-implemented method of claim 1, wherein deploying the first package and the second package includes:
   deploying the first package to a first host;
   determining, as a result of the affinity score being at a value relative to an affinity threshold, that the host that meets the latency criteria is the first host with the first package; and
   deploying the second package to the first host.

4. The computer-implemented method of claim 1, wherein determination that called method is to execute in accordance with the latency criteria is made based at least in part on identifying a notation, within the application source code, that indicates the latency criteria of the called method.

5. The computer-implemented method of claim 1, wherein:
   the latency criteria is first latency criteria;
   the computer-implemented method further comprises:

identifying a second instance of the called method within the method caller;

determining, from the application source code, that the second instance of the called method is to execute in accordance with second latency criteria different from the first latency criteria; and computing a second affinity value for the second instance of the called method based at least in part on the second latency criteria; and the affinity score is further based at least in part on the second affinity value.

6. A system, comprising at least one computing device having one or more processors and memory including instructions that implement one or more services, wherein the one or more services:

obtain, from application source code, a first method and a second method; as a result of a determination that the second method is dependent on the first method, determine, from latency notation present in the application source code, an affinity level between the first method and the second method;

calculate, based at least in part on the affinity level, an affinity score that indicates a target proximity between the first method and the second method;

output a first package including the first method and a second package including the second method;

record the affinity score between the first method and the second method as a score between the first package and the second package;

allocate one or more hosts to receive the first and second packages; and deploy the first package and the second package to the one or more hosts, in accordance with an affinity threshold.

7. The system of claim 6, wherein the one or more services that calculate the affinity score increase, based at least in part on a determination that the second method is called within a loop, the affinity score between the first method and the second method by an additional amount.

8. The system of claim 6, wherein the one or more services further comprise an executor, wherein the executor:

detects an occurrence of a specified event; and deploys, the first package and the second package as a result of detecting the occurrence of the specified event.

9. The system of claim 6, wherein the one or more services further comprise an executor, wherein the executor:

deploys the first package to a first host; and deploys the second package to a second host, the first host and the second host being:

different thread pools, different virtual computer systems, or different physical computer systems.

10. The system of claim 6, wherein the one or more services further comprise an executor, wherein the executor:

obtains the first package and the second package; and causes, in accordance with the affinity threshold, one or more hosts to be instantiated to host the first package and the second package.

11. The system of claim 6, wherein the affinity threshold is a member of a plurality of affinity thresholds, the plurality of affinity thresholds including different thresholds for determining whether to deploy the first package and the second package to separate threads, separate virtual hosts, or separate physical servers.

12. The system of claim 6, wherein the affinity threshold is dynamically determined based at least in part on availability of computing resources.

13. The system of claim 6, wherein the one or more services further comprise an executor, wherein the executor:

begins execution of the first package;

upon an occurrence of an invocation of the second package, determines whether the second package is located on the host; and on a condition that the second package is not located on the host:

submits a request to the executor to resolve the second package, the request including execution context information; and receives an execution result from the executor, the executor having obtained the execution result from execution of the second package.

14. A set of one or more non-transitory computer-readable storage media having stored thereon executable instructions that, as a result of being executed by one or more processors of a computer system, cause the computer system to:

evaluate application source code that includes notation that indicates a latency level between methods;

compute, based at least in part on the latency level, affinity scores for method dependencies in the application source code;

generate, in accordance with a clustering strategy that is based at least in part on the affinity scores, a set of packages, wherein the affinity score indicates a target proximity between methods in the set of packages; and deploy, via an executor, in accordance with an affinity threshold, the set of packages to at least one host.

15. The non-transitory computer-readable storage media of claim 14, wherein the executable instructions further comprise executable instructions that cause the computer system to dynamically establish the affinity threshold.

16. The non-transitory computer-readable storage media of claim 14, wherein the executable instructions that cause the computer system to allocate the at least one host further comprise executable instructions that cause the computer system to instantiate, in accordance with the affinity threshold, one or more virtual hosts to receive the set of packages.

17. The non-transitory computer-readable storage media of claim 14, wherein the executable instructions further comprise instructions that cause the computer system to enlist, in accordance with the affinity threshold, one or more physical servers to receive the set of packages.

18. The non-transitory computer-readable storage media of claim 14, wherein the executable instructions that cause the computer system to allocate the at least one host further comprise instructions that, as a result of being executed by the one or more processors, cause the computer system to instantiate, in accordance with the affinity threshold, one or more thread pools to receive the set of packages.

19. The non-transitory computer-readable storage media of claim 14, wherein the executable instructions further comprise instructions that cause the computer system to distribute the set of packages based on a number and capacity of available hosts.

20. The non-transitory computer-readable storage media of claim 14, wherein the executable instructions further comprise instructions that cause the computer system to distribute to at least one host that is a mobile device.

* * * * *